(12) United States Patent
Furuhata et al.

(10) Patent No.: US 6,813,235 B2
(45) Date of Patent: Nov. 2, 2004

(54) OPTICAL PICKUP APPARATUS AN OPTICAL AXIS CORRECTING ELEMENT

(75) Inventors: Hitoshi Furuhata, Tokorozawa (JP); Tomotaka Nishimura, Tokorozawa (JP); Nobuo Ishida, Tokorozawa (JP); Taichi Akiba, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/990,451

(22) Filed: Nov. 21, 2001

(65) Prior Publication Data

US 2002/0097659 A1 Jul. 25, 2002

(30) Foreign Application Priority Data

Nov. 27, 2000 (JP) ........................................ 2000-359219

(51) Int. Cl.[7] .................................................. G11B 7/00
(52) U.S. Cl. ............................. 369/112.05; 369/112.16; 369/44.38
(58) Field of Search ........................ 369/112.03, 112.05, 369/112.01, 44.37, 44.38, 44.41, 44.12, 44.14, 44.23, 112.16; 359/569

(56) References Cited

U.S. PATENT DOCUMENTS

| | | | | |
|---|---|---|---|---|
| 5,249,167 A | * | 9/1993 | Seo | 369/44.14 |
| 5,337,300 A | * | 8/1994 | Takishima et al. | 369/44.41 |
| 5,412,631 A | * | 5/1995 | Komma et al. | 369/44.37 |
| 5,594,713 A | * | 1/1997 | Komma et al. | 369/112 |
| 5,717,492 A | * | 2/1998 | Sentoku et al. | 356/401 |
| 5,978,344 A | * | 11/1999 | Horinouchi et al. | 369/112.19 |
| 6,084,843 A | * | 7/2000 | Abe et al. | 369/112 |
| 6,166,854 A | * | 12/2000 | Katsuma | 359/569 |
| 6,366,548 B1 | * | 4/2002 | Ohyama | 369/112.04 |
| 6,377,520 B2 | * | 4/2002 | Freeman et al. | 369/44.23 |
| 6,452,880 B1 | * | 9/2002 | Kawamura et al. | 369/44.37 |

* cited by examiner

Primary Examiner—Gautam R. Patel
(74) Attorney, Agent, or Firm—Perman & Green, LLP

(57) ABSTRACT

An optical pickup apparatus has a simplified configuration for using a plurality of laser beams at different wavelength to reduce the size, and a laser diode chip for use therewith. An irradiation light path for leading a laser beam emitted from a light emitter to a recording medium is provided with an optical axis correcting element for passing a first laser beam and for diffracting a second laser beam having a wavelength different from that of the first laser beam to generate diffracted light which has the optical axis substantially matching the optical axis of the first laser beam. The optical axis correcting element is arranged at a position at which the center of a light intensity distribution of the first laser beam incident thereto matches the center of a light intensity distribution of the second laser beam incident thereto.

7 Claims, 9 Drawing Sheets

OPTICAL PICKUP APPARATUS AN OPTICAL AXIS CORRECTING ELEMENT

BACKGROUND OF THE INVENTION

1. Field of the Invention

The present invention relates to an optical pickup apparatus for emitting a plurality of laser beams at different wavelengths to read information from a plurality of different recording media, and a laser diode chip for the optical pickup apparatus.

2. Description of Related Art

Generally, a semiconductor laser device is used as a light source for an optical pickup apparatus for reproducing optical discs such as a CD and a DVD.

For favorably reproducing the discs, semiconductor laser devices for emitting light at different wavelengths and objective lenses having different numerical apertures (NA) are required for reproducing a CD and for reproducing a DVD. For example, the reproduction of a DVD requires the wavelength of 650 nm and NA of 0.6, while the reproduction of a CD requires the wavelength of 780 nm and NA of 0.45.

For enabling a single player to reproduce different types of discs such as a CD and a DVD, an optical pickup apparatus which incorporates a light source for emitting light at two wavelengths 650 nm and 780 nm has been taken into consideration. FIG. 1 illustrates an example of the optical pickup apparatus.

The optical pickup apparatus illustrated in FIG. 1 comprises a laser device 1 for emitting a laser beam at wavelength of 650 nm; a laser device 2 for emitting a laser beam at wavelength of 780 mm; a combiner prism 4; a half mirror 4; a collimator lens 5; and an objective lens 6. These components are arranged in sequence. Further, a cylindrical lens (not shown) and a photodetector 7 are arranged on another optical axis which branches off the half mirror 4. In this configuration, an optical system from the combiner prism 3 to a disc 8 is shared by a CD and a DVD, so that in either case, light emitted from either of the laser devices is led to the disk 8 along the optical axis Y after it passes through the combiner prism 3. The objective lens 6 used herein is a bifocal lens which can provide focal points different from each other in accordance with the two wavelengths. This can limit spherical aberration caused by a difference in the thickness of surface substrate between a CD and a DVD.

However, the foregoing configuration requires a large number of parts including the combiner prism and is therefore expensive. In addition, the optical pickup apparatus requires alignment of the two laser devices with the combiner prism, causing a complicated configuration and difficult adjustments for the alignment.

OBJECT AND SUMMARY OF THE INVENTION

In view of the problem mentioned above, it is an object of the present invention to provide an optical pickup apparatus which is capable of simplifying the configuration for using a plurality of laser beams at different wavelengths to reduce the size, and a laser diode chip for use therewith.

An optical pickup apparatus according to the present invention includes a light emitter having a first light emitting section for emitting a first laser beam, and a second light emitting section for emitting a second laser beam having a wavelength different from that of the first laser beam, for selectively emitting a laser beam from one of the first and second light emitting sections, and an optical system formed with a irradiation light path for leading the laser beam emitted from the light emitter to a recording medium, and a reflection light path for leading the laser beam reflected by the recording medium to a light detector, wherein the irradiation light path includes a first optical axis correcting element for allowing the first laser beam to pass therethrough and for diffracting the second laser beam to generate diffracted light having an optical path substantially matching an optical path of the first laser beam, and the first optical axis correcting element being arranged at a position at which the center of a light intensity distribution of the first laser beam incident thereto matches the center of a light intensity distribution of the second laser beam incident thereto.

A laser diode chip for an optical pickup apparatus according to the present invention has at least two light emitting sections for emitting laser beams at different wavelengths from each other, wherein the at least two light emitting sections are arranged such that the laser beams are emitted in directions different from each other.

Also, an optical pickup apparatus according to the present invention includes a light emitter having a first light emitting section for emitting a first laser beam, and a second light emitting section for emitting a second laser beam having a wavelength different from that of the first laser beam, for selectively emitting a laser beam from one of the first and second light emitting sections, and an optical system formed with a irradiation light path for leading the laser beam emitted from the light emitter to a recording medium, and a reflection light pat for leading the laser beam reflected by the recording medium to a light detector, wherein the irradiation light path includes an optical axis correcting element for allowing the first laser beam to pass therethrough and for diffracting the second laser beam to generate diffracted light which is directed to substantially the same direction a the 0-order light of the first laser beam, and the optical axis correcting element is configured to diffract the second laser beam such that the centers of gravity of the light amount distributions of spots of the first and second laser beams match on a light receiving surface of the photodetector.

DETAILED DESCRIPTION OF THE EMBODIMENTS

In the following, embodiments of the present invention will be described in detail with reference to the accompanying drawings.

Figure 1:
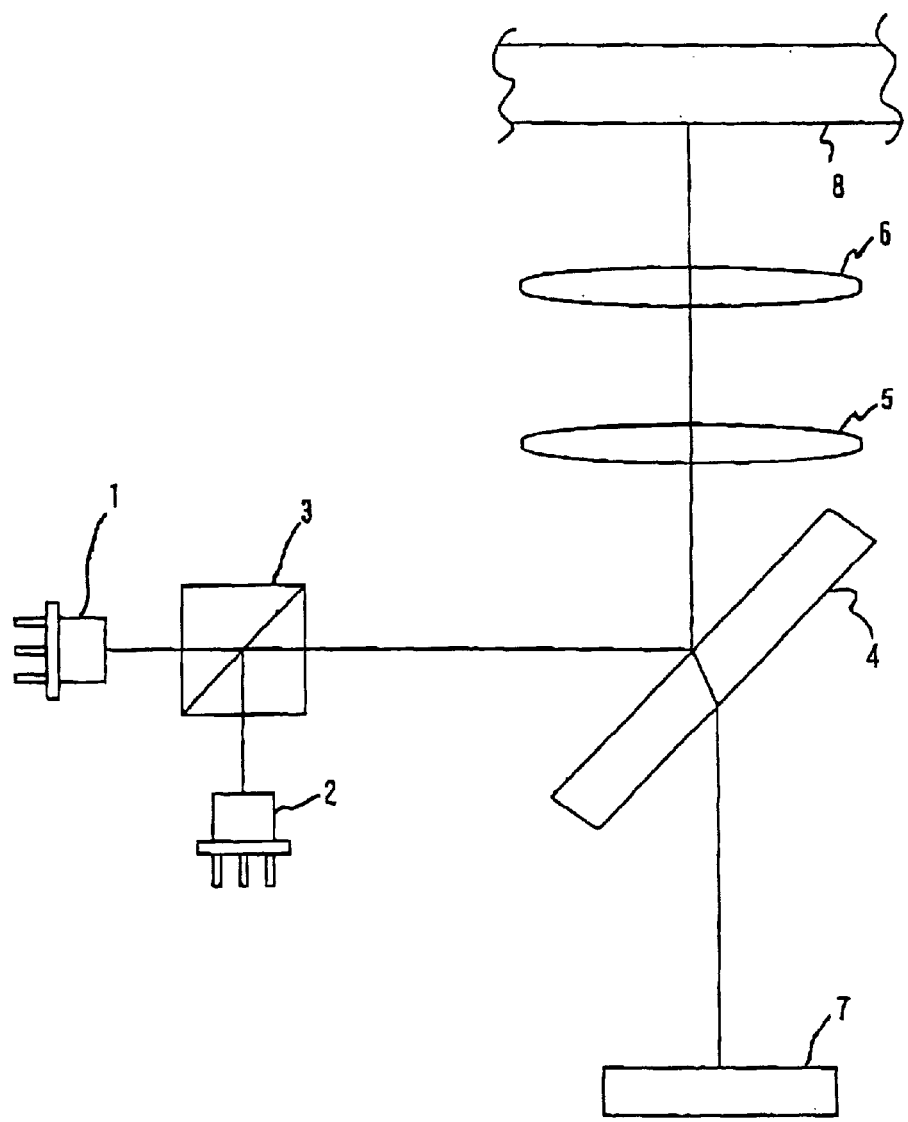
FIG. 1 is a schematic diagram illustrating an exemplary configuration of a conventional optical pickup apparatus.
Figure 2:
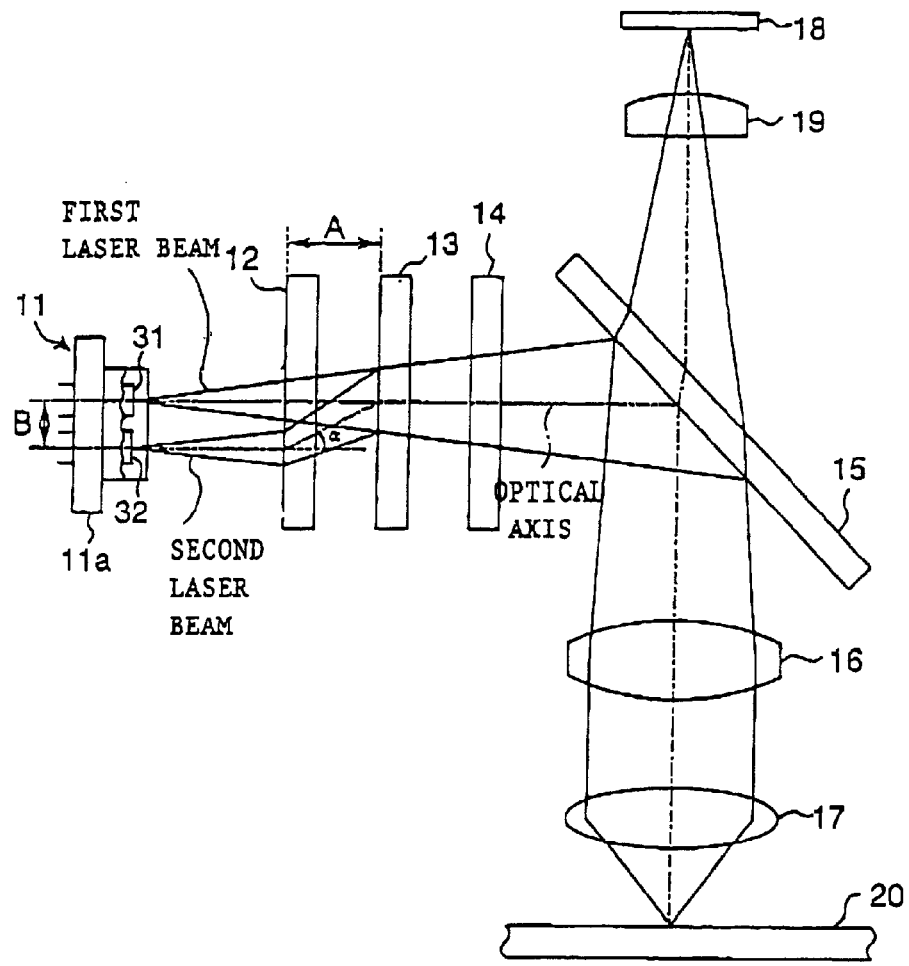
FIG. 2 is a schematic diagram illustrating the configuration of an optical pickup apparatus according to the present invention.
Figure 3:
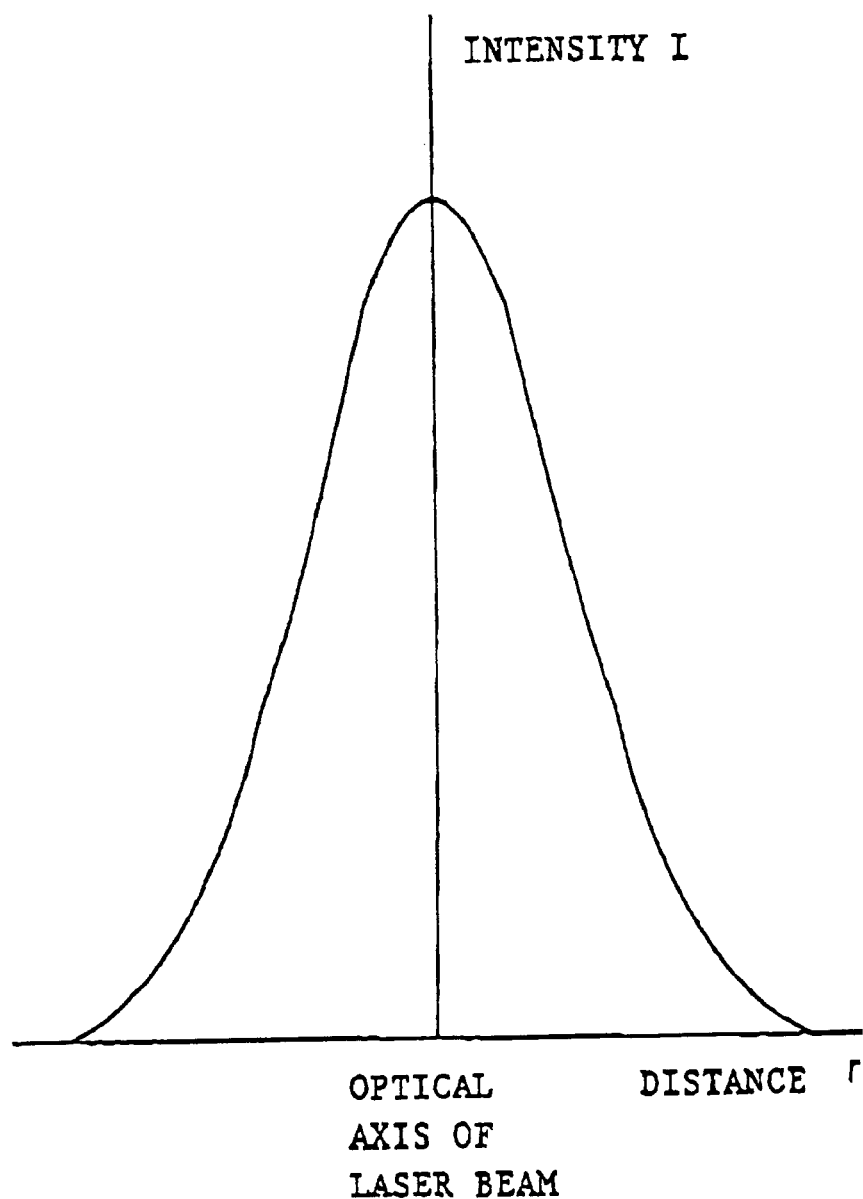
FIG. 3 is a graph showing a Gaussian distribution of a laser beam.

FIG. 2 illustrates an optical system of an optical pickup apparatus according to the present invention. This pickup apparatus has a semiconductor laser device 11 capable of emitting two laser beams at different wavelengths. The semiconductor laser device 11 has a first light emitting section 31 for emitting a first laser beam at wavelength of 650 nm for reading a DVD, and a second light emitting section for emitting a second laser beam at wavelength of 780 nm for reading a CD. Details of the semiconductor laser device 11 will be described later. Also, in the optical pickup apparatus, the laser beams emitted from the semiconductor laser device 11 reach a grating 14 through two optical axis correcting elements 12, 13. The optical axis correcting elements 12, 13 are comprised of brazed holograms for correcting one of the two laser beams having the longer wavelength for the optical axis to match the same with the optical axis of the laser beam having the shorter wavelength. The operation of the optical axis correcting elements 12, 13 will be described later. It should be noted that the optical axis refers to an axial line which extends along a traveling direction of a laser beam from a light emitting point to the center of the objective lens 17. Although two different optical axes exist in the pickup having two light emitting points, i.e., the first light emitting section 31 and second light emitting section 32, and the single objective lens 17 as is the case with this embodiment, this embodiment matches the two optical axes from the middle. Also, as illustrated in FIG. 3, the laser beam emitted from each light emitting section has a Gaussian intensity distribution characteristic in which the intensity is maximum at the center and becomes lower at a location further away from the center. The laser beams radiated from the first light emitting section 31 and second light emitting section 32 are emitted with their center lines of the intensity distributions being spaced in parallel, but in this embodiment, the center lines of the intensity distributions are matched from the middle.

The grating 14 is provided for separating a laser beam into a plurality of light flux (0-order light, ±1-order light). The grating 14 is provided for generating a pair of sub-beams for implementing a tracking servo according to a three-beam method, and specifically for separating a laser beam Into a plurality of light flux (0-order light, ±1-order light). In this embodiment, the three-beam method is employed for the tracking servo when reading a CD, wherein the 0-order light of the second laser beam is used as a main beam for generating a read signal RF and an error signal FE for a focus servo according to an astigmatism method, and the ±1-order light of the second laser beam is used as sub-beams for generating an error signal TE for the tracking servo according to the three-beam method. It should be noted that the tracking servo for reading a DVD is conducted in accordance with a phase difference method, so that the grating 14 is formed as a grating having such a depth that does not cause a diffractive action for the first laser beam at wavelength of 650 nm because a pair of sub-beams need not be generated from the first laser beam. The laser beams separated by the grating 14 reach the half mirror 15.

The half mirror 15 reflects a laser beam incident thereto substantially at an angle of 90 degrees. The reflected laser beam is directed toward an optical disc 20, which is a recording medium. The collimator lens 16 and objective lens 17 are arranged between the half mirror 15 and optical disc 20.

The laser beam reflected by the half mirror 15 reaches the disc 20 through the collimator lens 16 and objective lens 17 in this order. The collimator lens 16 collimates the laser beam from the half mirror 15 and supplies the collimated laser beam to the objective lens 17. The objective lens 17, which is a bifocal lens, converges the collimated laser beam on a recording surface of the disc 20. A DVD and a CD (including a CD-R) may be used as the disc 20, so that either one of them is mounted on a turn table, not shown.

The laser beam reflected by the recording surface of the disc 20 is transformed into a collimated laser beam by the objective lens 17, and again transformed into a converged laser beam by the collimator lens 16, before it passes through the half mirror 15 with slight inflection. The laser beam passing through the half mirror 15 reaches a photodetector 18 through a cylindrical lens 19. The cylindrical lens 19 functions as an astigmatism generating element for creating astigmatism.

Figure 4:
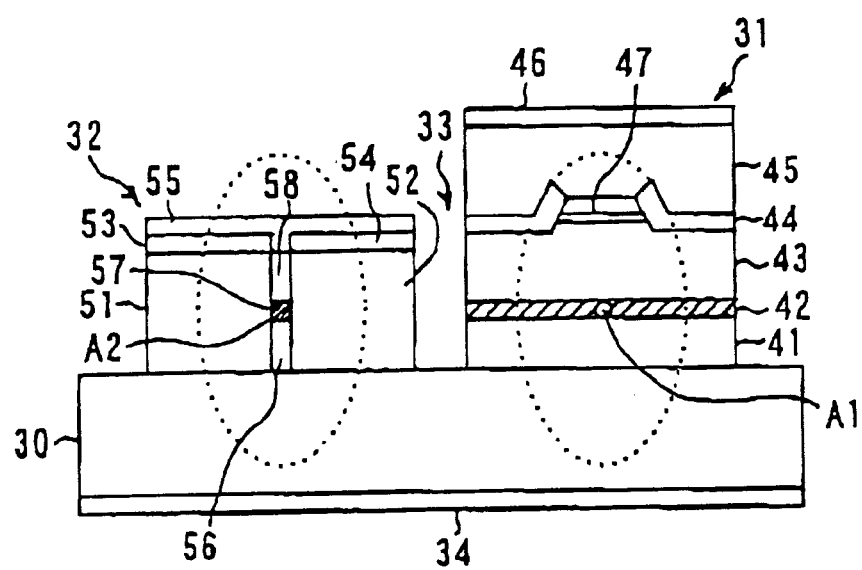
FIG. 4 is a sectional view illustrating the structure of a semiconductor laser device used in the apparatus of FIG. 2.

FIG. 4 Illustrates a cross-section of the chip of the semiconductor laser device 11. As illustrated in FIG. 4, the semiconductor laser device 11 is of a monolithic type formed in one chip, and has, on one main surface of a single Si substrate 30, a first light emitting section 31 having a first light emitting point A1 for emitting a first laser beam at wavelength of 650 nm; and a second light emitting section 32 having a second light emitting point A2 for emitting a second laser beam at wavelength of 780 nm. The first and second light emitting sections 31, 32 are separated by a separating groove 33. As described later, the first light emitting section 31 and second light emitting section 32 have a laminate structure. Also, the semiconductor laser device 11 has a back electrode 34, which serves as a common electrode to both light emitting sections 31, 32, on the other main surface of the substrate 30. A light emitting surface of the first light emitting section 31 having the light emitting point A1 and a light emitting surface of the second light emitting section 32 having the light emitting point A2 are oriented in the same emitting direction.

The first light emitting section 31 has an n-type AlGaInP cladding layer 41; a strained quantum well active layer 42; a p-type AlGaInP cladding layer 43; an n-type GaAs layer 44; a p-type GaAs layer 45; and an electrode 46 in this order from the substrate 30. In cross-section, the cladding layer 43 has its central portion formed in trapezoid. The n-type GaAs layer 44 is formed to cover the cladding layer 43 except for the top of the trapezoid. The p-type GaInP layer 47 is formed on the top of the trapezoid. The first light emitting point A1 is positioned in the strained quantum well active layer 42.

The second light emitting section 32, which is in a so-called double hetero structure, has a pair of n-type AlGaAs buried layers 51, 52 on the substrate 30 with a predetermined spacing defined therebetween. On each of the paired n-type AlGaAs buried layers 51, 52, one electrode 55 is provided through an insulating layer 53, 54. On the substrate 30 between the buried layers 51, 52, an n-type AlGaAs cladding layer 56; an undoped GaAs active layer 57; and a p-type AlGaAs cladding layer 58 are laminated in order. The cladding layer 58 is in contact with the electrode 55. The second light emitting point A2 is positioned in the active layer 57. The spacing between the optical axis of the first light emitting point A1 and the optical axis of the second light emitting point A2 is, for example, 100 μm.

The semiconductor laser device 11 is fixed on an insulating sub-mount, and they are further covered with a casing member 11a, as illustrated in FIG. 2.

The semiconductor laser device 11 selectively emits the first laser beam and second laser beam in response to a control signal from a laser driver (not shown). Though both beams will not be emitted simultaneously, the optical axis of the first laser beam is substantially in parallel with the optical axis of the second laser beam. The cross-sectional shape of the emitted first and second laser beams is elliptic, as indicated by dotted lines in FIG. 4.

Figure 5:
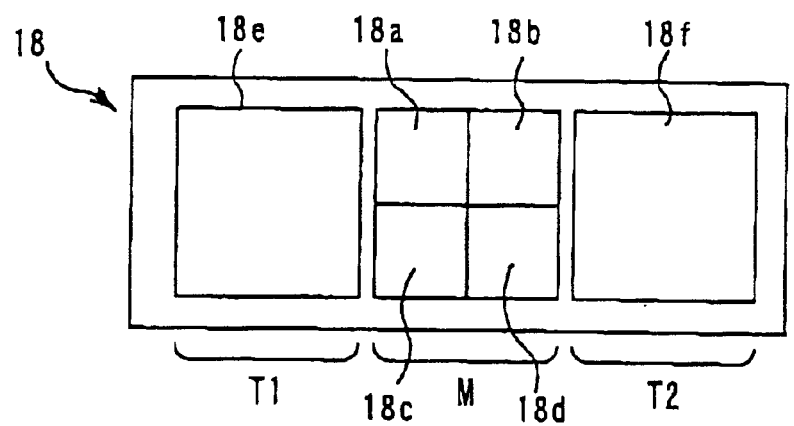
FIG. 5 is a diagram illustrating a light receiving pattern for a photodetector in the apparatus of FIG. 2.

The light receiving surface of the photodetector 18 is comprised of three square areas T1, M, T2, which are arranged in this order in a line on the same plane, as illustrated in FIG. 5. The area M is positioned between the areas T1, T2, and divided vertically and horizontally into four. Each of the divided areas is formed of a light receiving element 18a–18d. The light receiving elements 18a, 18d have their light receiving surfaces in a symmetrical relationship about the intersection of division lines, while the light receiving elements 18b, 18c have their light receiving surfaces in a symmetrical relationship about the intersection of the division lines. The areas T1, T2 are areas for tracking according to the three-beam method, and formed of light receiving elements 18e, 18f, respectively.

In the optical system of the optical pickup apparatus according to the present invention illustrated in FIG. 2, when the disc 20 is a DVD, the semiconductor laser device 11 emits the first laser beam at wavelength of 650 nm by selective driving of the laser driver circuit. The first laser beam passes through the optical axis correcting elements 12, 13 as it is without being subjected to a correction of its optical axis, passes through the grating 14 without being diffracted thereby, and reaches the half mirror 15.

The first laser beam reflected by the half mirror 15 reaches the disc 20 through the collimator lens 16 and objective lens 17, and the first laser beam reflected by the recording surface of the disc 20 reaches the area M on the light receiving surface of the photodetector 18 through the objective lens 17, collimator lens 16, half mirror 15, and cylindrical lens 19.

In accordance with respective output signals of the light receiving elements 18a–18d, a read signal RF, a tracking error signal TE and a focus error signal FE are generated. Assuming that the respective output signals of the light receiving elements 18a–18d are designated by a–d in this order, the read signal RF is calculated as expressed by:

$$RF = a + b + c + d$$

while the tracking error signal TE is calculated in accordance with the phase difference method, as expressed by:

$$TE = (a' + d') - (b' + c')$$

where a', b', c', d' are signals calculated by comparing the phases between the signals a, b, c, d and the read signal RP.

The focus error signal FE is calculated in accordance with the astigmatism method, as expressed by:

$$FE = (a + d) - (b + c)$$

These read signal RF, focus error signal FE and tracking error signal TE are generated in a processing circuit, not shown.

When the disc 20 is a CD, the semiconductor laser device 11 emits the second laser beam at wavelength of 780 nm by selective driving of the laser driver circuit. As the second laser beam reaches the optical axis correcting elements 12, the 1-order diffracted light is produced by the diffracting action of the optical axis correcting element 12, and serves as a main beam. The main beam, the 1-order diffracted light of the second laser beam, is inflected by the optical axis correcting element 12 by an angle a toward the optical axis of the first laser beam. The center line of the intensity distribution matches the optical axis of the main beam. As illustrated in FIG. 2, when the second laser beam, which has its optical axis inflected by the angle α, reaches the optical axis correcting element 13, the center line of the intensity distribution intersects the center line of the intensity distribution of the first laser beam. Further, by the diffracting action of the optical axis correcting element 13, the 1-order diffracted light is produced from the second laser beam, and serves as a main beam. The optical axis of the second laser beam is returned by the angle α toward the original direction, whereby the second laser beam has the center line of the intensity distribution substantially matching the center line of the intensity distribution which is the optical axis of the first laser beam. In other words, the second laser beam can be made to be a laser beam which has the optical axis and the center line of intensity distribution matching those of the first laser beam.

Here, assuming that the spacing between the positions of the optical axis correcting elements 12, 13 is A, and the distance between the first light emitting point A1 of the first laser beam and the second light emitting point A2 of the second laser beam is B, the following relationship is established:

$$B = A \cdot \tan \alpha$$

As the second laser beam reaches the grating 14 after passing through the optical axis correcting element 13, ±1order light, with respect to the ±1-order light of the second laser beam, is produced by the diffracting action of the grating 14. The ±1-order light is used as sub-beams for generating the tracking error signal in accordance with the three-beam method.

The second laser beam passing through the grating 14 in this way is reflected by the half mirror 15, and then reaches the disc 20 through the collimator lens 16 and objective lens 17. Each order light of the second laser beam reflected by the recording surface of the disc 20 reaches the areas T1, M, T2 on the light receiving surface of the photodetector 18 through the objective lens 17, collimator lens 16, half mirror 15, and cylindrical lens 19. Specifically, the main beam of the second laser beam forms a light spot on the area M, while the sub-beams for tracking form light spots on the areas T1, T2, respectively.

The read signal RF and focus error signal FE are generated in accordance with the respective outputs of the light receiving elements 18a–18d. Also, the tracking error signal TE is generated in accordance with the respective output signals of the light receiving elements 18e, 18f. Assuming that the output signals of the light receiving elements 18a–18f are designated by a–f in this order, the read signal RF is calculated as expressed by;

$$RF = a + b + c + d$$

while the tracking error signal TE is calculated in accordance with the three-beam method, as expressed by:

$$TE = e - f$$

The focus error signal FE is calculated in accordance with the astigmatism method, as expressed by;

$$FE = (a + d) - (b + c)$$

While in the foregoing embodiment, the optical axis correcting elements 12, 13 are separately formed, they may be formed as an integrated element. In addition, the optical axis correcting elements 12, 13 may be integrated into a single unit together with the semiconductor laser device 11.

Figure 6:
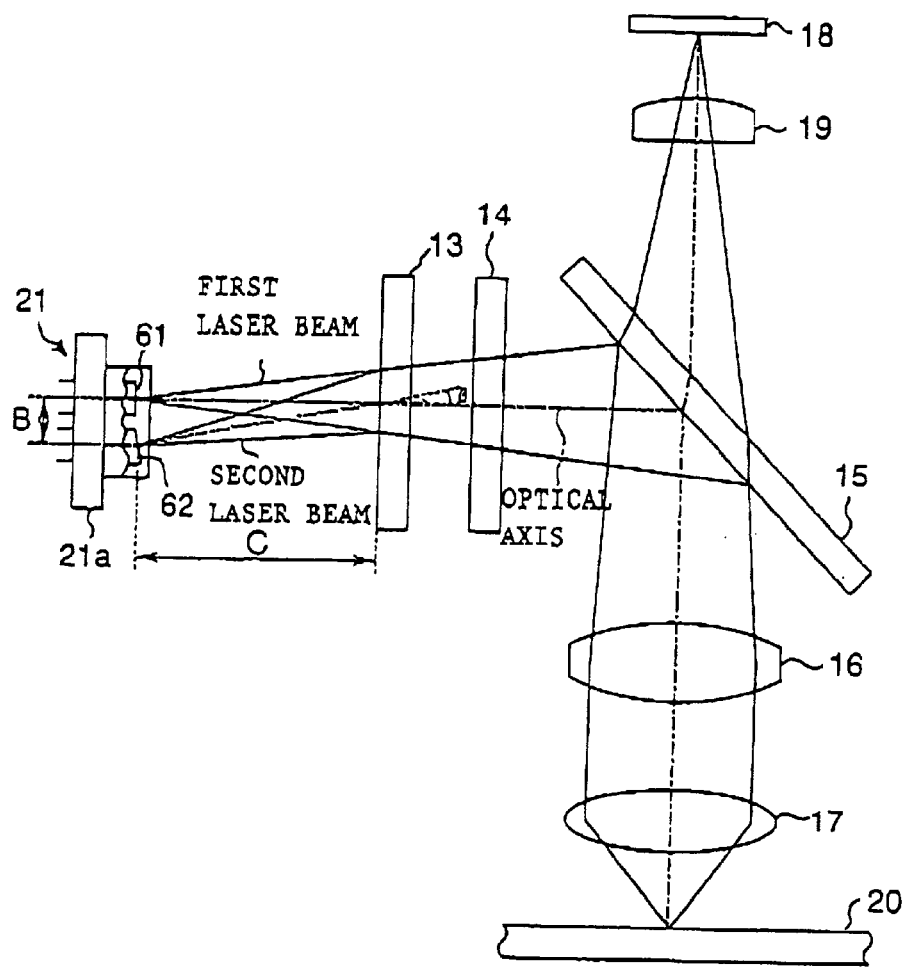
FIG. 6 is a schematic diagram illustrating the configuration of an optical pickup apparatus according to another embodiment of the present invention.

FIG. 6 illustrates an optical system of an optical pickup apparatus as another embodiment of the present invention. This optical system employs, instead of the semiconductor laser device 11 illustrated in FIG. 2, a semiconductor laser device 21 in which one of two light emitting sections is tilted. Also, the optical axis correcting element 12 in FIG. 2 is eliminated from the optical system.

Figure 7:
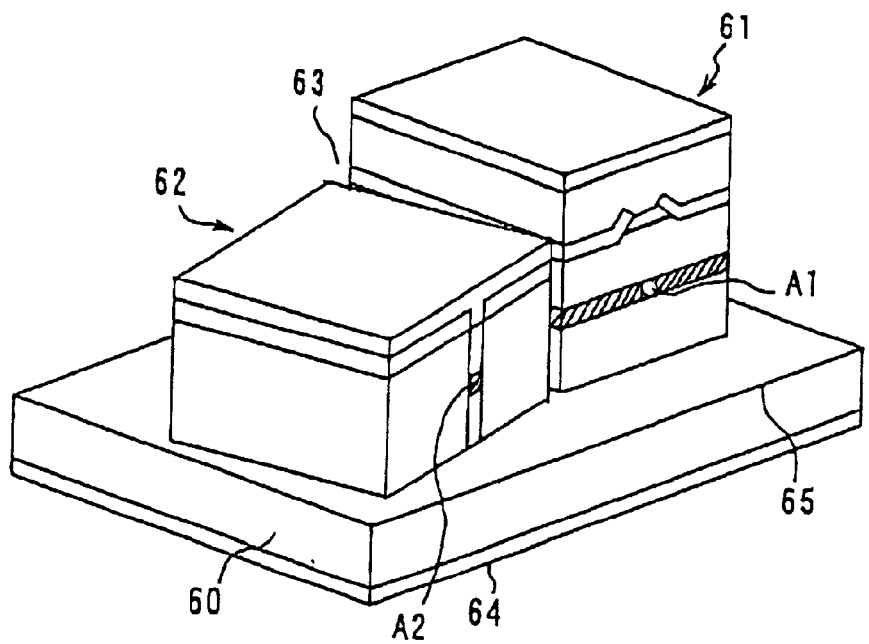
FIG. 7 is a perspective view illustrating the structure of a semiconductor device in the apparatus of FIG. 6.

FIG. 7 illustrates a chip of the semiconductor laser device 21. As illustrated in FIG. 7, the semiconductor laser device 21 is of a monolithic type formed in one chip, and has, on one main surface of a single Si substrate 60, a first light emitting section 61 having a first light emitting point A1 for emitting a first laser beam at wavelength of 650 nm; and a second light emitting section 62 having a second light emitting point A2 for emitting a second laser beam at wavelength of 780 nm. The first and second light emitting sections 61, 62 are separated by a separating groove 63. The first light emitting section 61 and second light emitting section 62 have structures similar to those of the first light emitting section 31 and second light emitting section 32 described above, respectively. On the other main surface of the substrate 60, the semiconductor laser device 21 has a back electrode 64 which is a common electrode to both light emitting sections 61, 62.

A light emitting surface of the first light emitting section 61 and a light emitting surface of the second light emitting section 62 are oriented in emitting directions different from each other. Specifically, while the first emitter 61 has its light emitting surface oriented in parallel with a front edge 65 of the substrate 60, as is the case with the first light emitting section 31 in FIG. 2, the second light emitting section 62 has its light emitting surface oriented at an angle of β to the front edge 65 of the substrate 60, instead of in parallel therewith. The light emitting surface of the second light emitting section 62 is substantially aligned with the light emitting surface of the first light emitting section 61 at the right end in FIG. 7, and the portion of the light emitting surface to the left of the right end protrudes toward the front edge 65 by an inclination of the angle β. This positioning places the second light emitting section 62 in such a relationship that the second laser beam emitted thereby has the center line of the intensity distribution which intersects the center line of the intensity distribution of the first laser beam emitted by the first light emitting section 61.

The optical axis correcting element 13 is arranged at a position at which the optical axes of the first and second laser beams intersect each other.

The remaining configuration of the optical system is similar to that illustrated in FIG. 2.

The semiconductor laser device 21 is fixed on an insulating sub-mount, and they are further covered with a casing member 21a, as illustrated in FIG. 6. The semiconductor laser device 21 selectively emits the first laser beam and second laser beam in response to a control signal from a laser driver (not shown).

In the optical system of the optical pickup apparatus according to the present invention illustrated in FIG. 6, when the disc 20 is a DVD, the semiconductor laser device 21 emits the first laser beam at wavelength of 650 nm. The first laser beam passes through the optical axis correcting element 13 as it is without being subjected to a correction of its optical axis, passes through the grating 14 without being diffracted thereby, and reaches the half mirror 15.

The first laser beam reflected by the half mirror 15 reaches the disc 20 through the collimator lens 16 and objective lens 17, and the first laser beam reflected by the recording surface of the disc 20 reaches the area M on the light receiving surface of the photodetector 16 through the objective lens 17, collimator lens 16, half mirror 15, and cylindrical lens 19.

When the disc 20 is a CD, the semiconductor laser device 21 emits the second laser beam at wavelength of 780 nm. As described above, since the second light emitting section 62 is arranged at an angle of β on the substrate 60, the center line of the intensity distribution, which is the optical axis of the second laser beam, is oriented by the angle β toward the optical axis of the first laser beam. As the second laser beam reaches the optical axis correcting element 13, the 1-order diffracted light is produced by the diffracting action of the optical axis correcting element 13. The center line of the intensity distribution of the 1-order diffracted light of the second laser beam is corrected by the angle β in a direction by the correcting element 13. Thus, the center line of the intensity distribution serves as the optical axis of the second laser beam which substantially matches the optical axis of the first laser beam.

Assuming now that the distance between the first light emitting point A1 of the first laser beam and the light emitting point A2 of the second laser beam is B, and the distance from the light emitting point A2 of the second laser beam to the optical axis correcting element 13 is C, the following relationship is established:

$$B = C \cdot \tan \beta$$

As the second laser beam reaches the grating 14 after passing through the optical axis correcting element 13, ±1-order light, with respect to the ±1-order light of the second laser beam, is produced by the diffracting action of the grating 14. The ±1-order light is used as sub-beams for generating the tracking error signal in accordance with the three-beam method.

The second laser beam passing through the grating 14 in this way is reflected by the half mirror 15, and then reaches the disc 20 through the collimator lens 16 and objective lens 17. Each order light of the second laser beam reflected by the recording surface of the disc 20 reaches the areas T1, M, T2 on the light receiving surface of the photodetector 18 through the objective lens 17, collimator lens 16, half mirror 15, and cylindrical lens 19.

The read signal RF, tracking error signal TE and focus error signal FE are generated in a similar way to the optical pickup apparatus of FIG. 2 when the disc 20 is a DVD or a CD.

Figure 8:
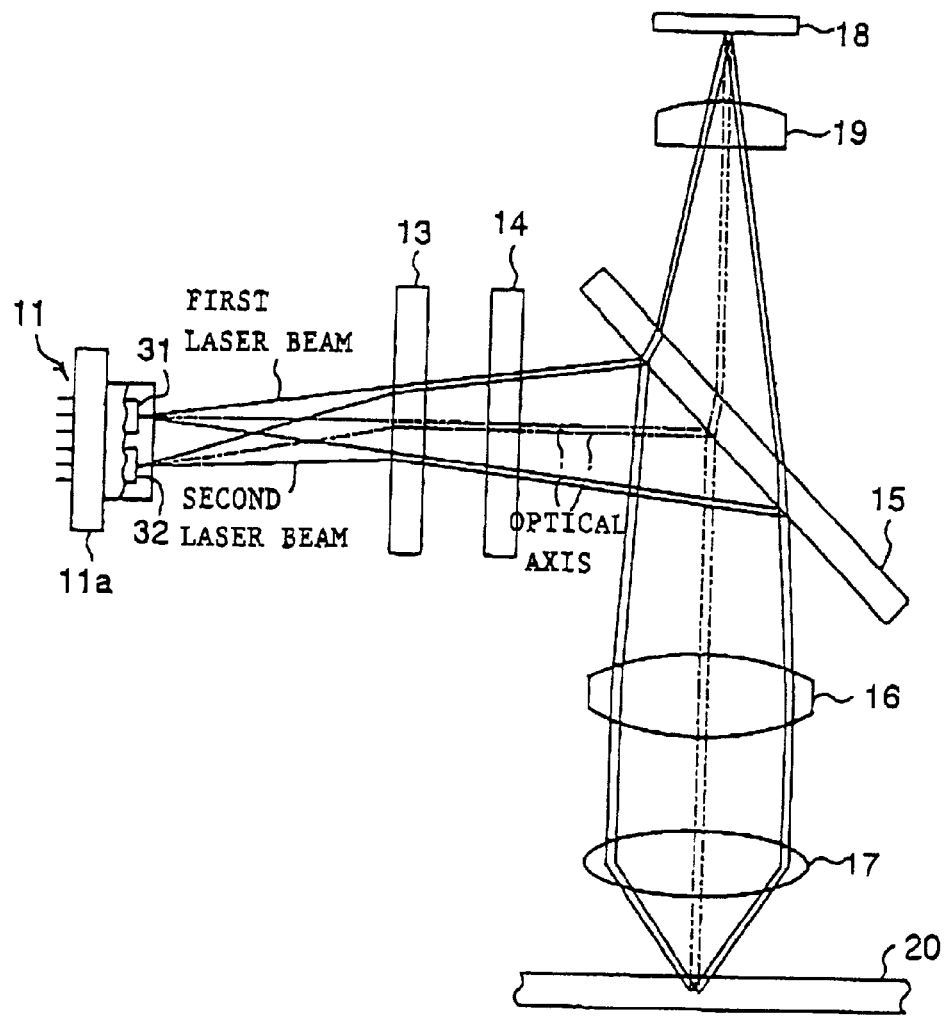
FIG. 8 is a schematic diagram illustrating the configuration of an optical pickup apparatus according to a further embodiment of the present invention.

FIG. 8 Illustrates an optical system of an optical pickup apparatus as a further embodiment of the present invention. In this optical system, an optical axis correcting element 13 is arranged between the semiconductor laser device 11 and grating 14 of the optical system in FIG. 2.

The remaining configuration of the optical system is similar to that illustrated in FIG. 2.

The optical axis correcting element 13 lets the first laser beam emitted from the semiconductor laser device 11 pass therethrough without correcting its optical axis. For the second laser beam emitted from the semiconductor laser device 11, the 1-order diffracted light produced by the optical axis correcting element 13 reaches a disc through the grating 14 and the like. Here, the optical axis of the 1-order diffracted light of the second laser beam is corrected to slightly shift with respect to the optical axis of the first laser beam, and the center line of the intensity distribution of the 1-order diffracted light of the second laser beam is also corrected to slightly shift from the optical axis of the first laser beam, i.e., the center line of the intensity distribution of the first laser beam. In other wards, the optical axis of the first laser beam is slightly different from the optical axis of the 1-order diffracted light of the second laser beam in the incident angle to the center of the objective lens 17. This correction is performed on the quadrant light receiving surface comprised of the light receiving elements 18a–18d of the photodetector 18 in such a degree that the center of gravity of a light amount distribution of a light spot received from the second laser beam is positioned at the intersection of two division lines.

A light intensity distribution on the quadrant light receiving surface may be graphically shown in the following manner for each of the first and second laser beams.

Figure 9:
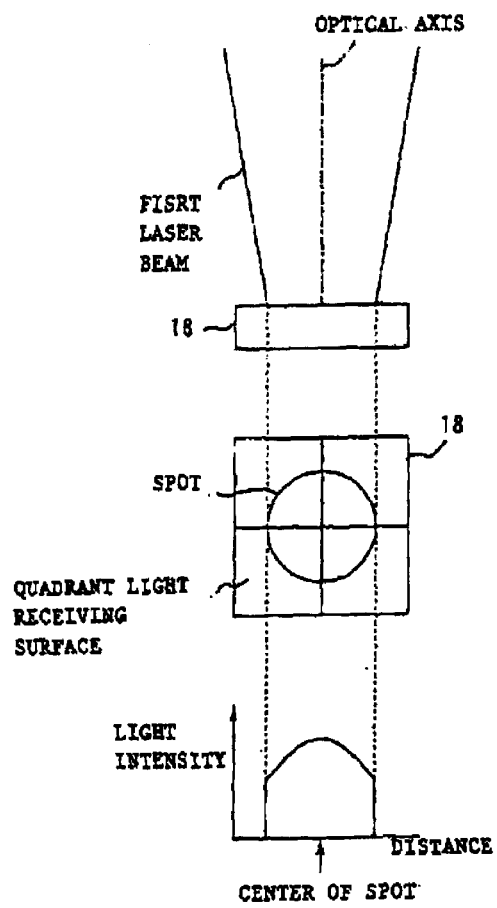
FIG. 9 is a diagram showing the relationship among the optical axis of a first laser beam, the position of a spot on a quadrant light receiving surface of a photodetector, and a light intensity distribution of the spot.

Since the optical axis of the first laser beam is not corrected by the optical axis correcting element 13, the optical axis of the first laser beam matches the intersection of the division lines on the quadrant light receiving surface of the photodetector 18, with a circular spot formed about the intersection of the division lines, as illustrated in FIG. 9. A light intensity distribution of the spot is symmetric about the optical axis of the first laser beam, i.e., the center of the spot at which the light intensity is maximum.

Figure 10:
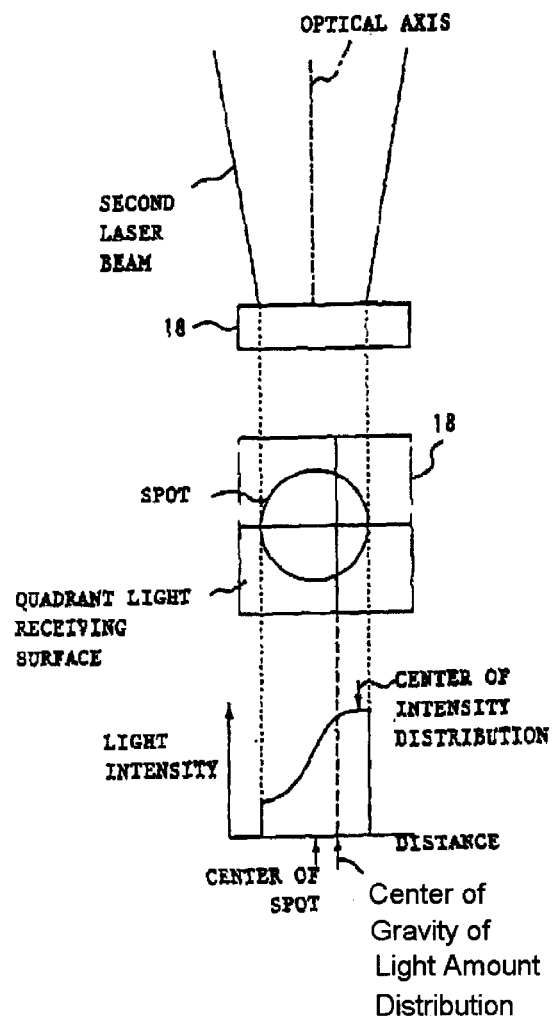
FIG. 10 is a diagram showing the relationship among the optical axis of a second laser beam, the position of a spot on the quadrant light receiving surface of a photodetector, and a light intensity distribution of the spot.

On the other hand, since the second laser beam is corrected by the optical axis correcting element 13 such that its optical axis and center line of he intensity distribution do not match those of the first laser beam, a substantially circular spot is formed as illustrated in FIG. 10, in which the optical axis of the second laser beam slightly deviates from the intersection of the division lines on the quadrant light receiving surface of the photodetector 18, and the center line of the intensity distribution slightly deviates from the intersection of the division lines. However, the correction in this embodiment is performed such that the center of gravity of the light amount distribution of the spot matches the intersection of the division lines. In this way, the amount of received light can be substantially equal in each of the four-divided light receiving areas, thereby making it possible to precisely detect the focus error signal in accordance with the astigmatism method.

In the foregoing embodiment, the optical axis of the second laser beam is corrected such that the center of gravity of the light amount distribution in the light spot of the second laser beam matches the center of gravity of the light amount distribution in the light spot of the first laser beam, thereby making it possible to reduce the number of optical axis correcting elements as compared with the aforementioned embodiment.

Also, while the foregoing embodiments have been described for an infinite optical system using the collimator lens 16 to which the present invention is applied, the present invention can also be applied to a finite optical system.

Further, while in the foregoing embodiments, the semiconductor laser device is provided with two light emitting points at different light emitting wavelengths, the present invention can also be applied to a semiconductor laser device which comprises three or more light emitting points at light emitting wavelengths different from one another.

Further, while the foregoing embodiments employ the brazed holograms as the optical axis correcting elements, the present invention is not limited to this particular element, but any other optical element may be used as long as it has the diffracting action.

Further, while the foregoing embodiments employ the monolithic semiconductor laser device 11, the present invention is not limited to this particular device, but a hybrid semiconductor laser device may be used as well.

As described above, according to the present invention, the optical system can be intensively populated in a compact fashion, thus making it possible to simplify the configuration of the optical pickup apparatus and reduce the size of the same.

Also, each of the spots produced by the first and second laser beams, formed on the light receiving surface of the photodetector by correcting the difference in the light intensity distribution based on the difference in light emitting positions between the two light emitting sections, can take an appropriate light intensity distribution. It is therefore possible to precisely produce a read signal from the photodetector when either the first or the second laser beam is used. Further, when using the quadrant photodetector, the focus error signal in accordance with the astigmatism method, or the tracking error signal in accordance with the phase difference method can be precisely detected from the output of the photodetector.

This application is based on Japanese Patent Application No. 2000-359219 which is hereby incorporated by reference.

What is claimed is:

1. An optical pickup apparatus comprising:
   a light emitter having a first light emitting section for emitting a first laser beam, and a second light emitting section for emitting a second laser beam having a wavelength different from that of said first laser beam, for selectively emitting a laser beam from one of said first and second light emitting sections; and
   an optical system formed with a irradiation light path for leading the laser beam emitted from said light emitter to a recording medium, and a reflection light path for leading the laser beam reflected by said recording medium to a light detector,
   said irradiation light path including an optical axis correcting element for allowing said first laser beam to pass therethrough and for diffracting said second laser beam that the first order diffracted light of said second laser beam and the 0-order light of said first laser beam respectively reflected by said recording medium overlap each other on a light receiving surface of said light detector; and
   said optical axis correcting element being configured to diffract said second laser beam such that the centers of gravity of light amount distributions of spots of said first and second laser beams match on light receiving surface of said photodetector.

2. An optical pickup apparatus according to claim 1, wherein said photodetector has the quadrant light receiving surface divided vertically and horizontally into four areas, wherein the center of gravity of the light amount distribution of a 0-order light beam of said first laser beam and the center of gravity of the light amount distribution of the diffracted light of said second laser beam are positioned at an intersection of division lines on said quadrant light receiving surface.

3. An optical pickup apparatus according to claim 2, wherein the optical axis of the 0-order light beam of said first laser beam matches the intersection of the division lines on said quadrant light receiving surface, and the optical axis of the diffracted light of said second laser beam slightly deviates from the intersection of the division lines on said quadrant light receiving surface.

4. An optical pickup apparatus according to claim 2, wherein said optical pickup apparatus generates a focus error signal in accordance with an astigmatism method or a tracking error signal in accordance with a phase difference method, according to outputs of the light receiving areas on said quadrant light receiving surface.

5. An optical pickup apparatus according to claim 1, wherein said optical axis correcting element comprises a brazed hologram.

6. An optical pickup apparatus according to claim 1, wherein said first optical axis correcting element is arranged immediately after a position at which said light emitter is arranged.

7. An optical pickup apparatus according to claim 1, wherein said first optical axis correcting element allows said first laser beam to pass therethrough as a 0-order light beam without alteration.

* * * * *